United States Patent Office 3,525,650
Patented Aug. 25, 1970

3,525,650

METHOD OF PRODUCING A WATER-INSOLUBLE GERMANIUM OXIDE COATING AT THE SURFACE OF A GERMANIUM CRYSTAL

Erich Pammer and Dieter Maly, Munich, Germany, assignors to Siemens Aktiengesellschaft, Berlin and Munich, Germany, a corporation of Germany No Drawing. Filed Dec. 5, 1966, Ser. No. 598,954
Claims priority, application Germany, Dec. 10, 1965, S 100,895
Int. Cl. C23f *7/02*
U.S. Cl. 148—6.14 5 Claims

ABSTRACT OF THE DISCLOSURE

Processes whereby Ge body is heated in hydroxyl group containing liquid at pressure of at least 5 atmospheres to form water-insoluble tetragonal $GeO_2$ coating on Ge.

DISCLOSURE

It is known to use $SiO_2$ coatings on silicon semiconductor components in order to protect the components against atmospheric disturbances. These coatings may be produced through oxidation of the semiconductor surface. The silicon oxide layer produced at the semiconductor surface through oxidation thereof gives the components more favorable electric properties than vapor deposited silicon oxide $SiO_2$. When germanium is used as a semiconductor material, protective layers of silicon oxide must be applied by vapor deposition. It would be desirable to produce a protective layer, resulting directly from the oxidation of the germanium semiconductor surface. Such a layer should be water-insoluble.

Our invention has as an object to achieve this goal and provide a method for producing water-insoluble germanium oxide coating at the surface of a germanium crystal. Thus, protective layers are produced upon the surface of finished germanium semiconductor components by oxidation of the germanium surface. According to the invention, the germanium crystal to be oxidized is heated in a hydroxyl-containing liquid, under a pressure of at least 5 atmospheres, to form the oxide coating. By this method, the germanium crystal surface may be converted directly into tetragonal $GeO_2$, which is not attacked by hydrofluoric, sulphuric or hydrochloric acids, or by bases.

The heretofore known methods for producing tetragonal $GeO_2$ start with normal or hexagonal $GeO_2$ and require a lengthy tempering thereof at temperatures of about 700° C. at elevated pressure. For this reason, the known methods for producing protective coating of finished semiconductor components seem hardly suitable.

In contrast to the above, using our method we can achieve oxidation even at temperatures below 400° C., with direct formation of water- and acid-insoluble tetragonal germanium oxide, $GeO_2$. The invention will be described in greater detail below.

The germanium discs or structural components, to be oxidized, are placed into a holder or container of thermally and chemically inert material. The holder is so constructed that as much as possible of the surface to be oxidized is exposed. The loaded holder is then placed into a pressure vessel such as an autoclave. The pressure vesesl is filled with water, alcohol or another liquid containing hydroxyl groups, at least to the point where the germanium crystals to be oxidized, are submerged therein. Thereafter, an inner pressure of 30 or more atmospheres is produces within the pressure vessel. This may be effected, for example, by means of piston pressure as in a hydraulic press.

The desired high pressure which may considerably exceed the given value, can be obtained by a pressure gas cylinder, which is attached to the autoclave. The type of pressure gas to be used is of secondary importance, provided it does not counteract the oxidative effect of the liquid bath. Air, nitrogen, argon and $CO_2$ etc. may be used. The autoclave is closed, while its inner pressure is maintained, and heated to temperatures above 150° C., for example to 300° C., for at least 10 minutes, but preferably for about half an hour. The inner pressure in the autoclave can also be produced only by the vapor pressure of the hydroxyl-containing liquid, e.g. water, by heating under sealed conditions of the autoclave. This immediately produces, according to the reaction equation $$Ge+2H_2O \rightleftarrows GeO_2+4H_2$$

the tetragonal $GeO_2$ which is stable and insoluble in this temperature range.

According to the heating period under these conditions, blue, brown or, during periods of 1–2 hours, even colorless, slightly opalizing $GeO_2$ layers are produced. After the autoclave has been vented and cooled, the oxidized germanium crystals or semiconductor devices may be further processed. A slight etching removal of the germanium, which is generally observed, may be avoided by dissolving hexagonal $GeO_2$ to saturation in the liquid bath, prior to the insertion of the crystals.

We claim:

1. A method of producing a water-insoluble tetragonal germanium dioxide coating upon the surface of a germanium crystal, thereby protecting the surface of finished germanium semiconductor structural components, which consists of oxidizing the germanium crystal by heating in a hydroxyl-containing liquid, at a pressure of at least 5 atmospheres, thereby forming a water-insoluble tetragonal germanium dioxide coating on the surface of the germanium crystal.

2. The method of claim 1, wherein the hydroxyl-containing liquid is water.

3. The method of claim 1, wherein the hydroxyl-containing liquid is an alcohol.

4. The method of claim 1, wherein the germanium crystals to be oxidized and the liquid are so placed into a pressure vessel that the liquid bath completely covers the germanium crystals, an inner pressure of at least 5 atmospheres is produced in the pressure vessel and, at this pressure, the content of the pressure vessel is heated to at least 150° C., for at least 10 minutes.

5. The method of claim 4, wherein the pressure is about 30 atmospheres, the temperature is about 300° C., and the time about at least one half hour.

References Cited

UNITED STATES PATENTS 3,340,163 9/1967 Bradshaw et al. ---- 117—118 X
3,401,054 9/1968 Wilkes ---------- 117—118 X RALPH S. KENDALL, Primary Examiner U.S. Cl. X.R.

117—201